A. M. Glover,
Cotton Press.
Nº 13,199.  Patented July 3, 1855.
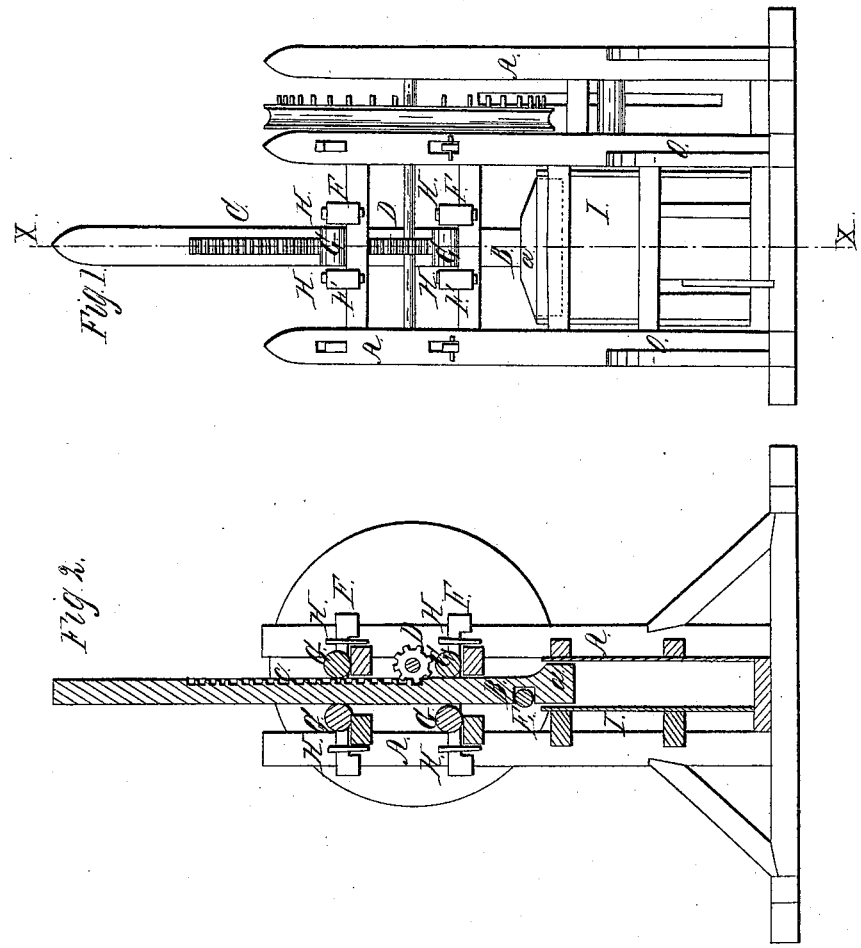

UNITED STATES PATENT OFFICE.

AUGUSTUS M. GLOVER, OF WATERBOROUGH, SOUTH CAROLINA.

IMPROVEMENT IN COTTON-PRESSES.

Specification forming part of Letters Patent No. 13,199, dated July 3, 1855.

*To all whom it may concern:*

Be it known that I, AUGUSTUS M. GLOVER, of Waterborough, in the district of Colleton and State of South Carolina, have invented certain new and useful Improvements in Cotton-Presses; and I do hereby declare that the following is a full, clear, and exact description of the same, reference being had to the accompanying drawings, making a part of this specification.

The packing of cotton is essentially different from making hay into bundles, and there is an absolute dissimilarity in the construction of the press and those small variations of device and arrangement requsite in the one case which would not be at all necessary in the other. I premise these remarks because there is a tendency to consider the press that hay may be packed in as equally applicable to packing cotton and pressing it into such form, and while so pressed to admit of the wrappers being sewed up, the ropes tied tightly, and the bale completed while undergoing the operation. The arrangement for keeping the wrapper clear of the platen necessary in packing cotton is not at all required in pressing hay. There is another consideration I wish to present—viz., such facility in introducing the cotton into the box or hopper when the platen is up that extra handling thereof may be dispensed with. In my improvement I have accomplished several desirable results, viz: By the introduction of a roller, E, upon the side of the rack-rod opposite to the rack, I am enabled to guide the platen $a$ in its movement in the box without liability of the wrapper or bagging being either ruptured or wrinkled, as the platen is prevented from touching the wrapper by said roller projecting slightly beyond the face of the platen. This improvement is more clearly understood and the use of the roller more apparent when the platen is at its descent and the sides of the box removed. In that case, after the bale is fully compressed, and is below the edge of the bale-box, or that portion below the line O O, so as to allow the roping to be tied, the guide-roller G outside of the packing-box would be of little use in keeping the platen in position.

The following is a description of my press.

A A are uprights or framing, with suitable cross-girts.

I is a box or hopper, the portion above the line O O being permanent, whereas that below is removable to allow the bale to be made and to be removed.

B is a rack-rod, and D a small pinion by which it is actuated.

C is the rack.

G G G G are guide-rollers for the rack-rod or piston.

F F are sliding boxes or clamps for rollers G.

E is a roller in the rack-rod B, at its lower end projecting slightly beyond the face of the rod and also beyond $a$, the platen. This platen does not occupy the whole of the space in the box I, but leaves sufficient for the bagging or wrapper with which the box is lined previously to introducing the loose cotton, by turning the platen partially around upon a swivel-pin when above the box. The box and platen, being oblong, change in position, leaving openings for introducing cotton under the platen immediately from the gin without removing the platen or change of position in the gear.

It will be noticed that, as the pitch-line of the cogs passes through the center of the platen, a more perfect and even pressure of the bale is obtained, and as all tendency to interfere with the bagging or wrapper is avoided by combining the roller E with the rack and pinion, a material improvement is thus obtained.

Having described my improvement, what I claim as my invention, and desire to secure by Letters Patent, is—

The use of the roller E, moving with the platen $a$, in combination with the rack C and pinion D, as described, for the purpose of preventing the platen touching the sacking in its descent and keeping the platen in position when below the hopper and the sides of the bale-box removed, as set forth.

In testimony whereof I have hereunto signed my name before two subscribing witnesses.

A. M. GLOVER.

Witnesses:
W. S. CLARK,
SAML. GRUBB.